US009723805B2

(12) United States Patent
Nyberg

(10) Patent No.: US 9,723,805 B2
(45) Date of Patent: *Aug. 8, 2017

(54) ROTATING ANIMAL MILKING PLATFORM CONTROL AND MONITORING SYSTEM

(71) Applicant: DELAVAL HOLDING AB, Tumba (SE)

(72) Inventor: Anders Nyberg, Spanga (SE)

(73) Assignee: DELAVAL HOLDING AB, Tumba (SE)

( * ) Notice: Subject to any disclaimer, the term of this patent is extended or adjusted under 35 U.S.C. 154(b) by 0 days.

This patent is subject to a terminal disclaimer.

(21) Appl. No.: 15/152,582

(22) Filed: May 12, 2016

(65) Prior Publication Data

US 2016/0270360 A1    Sep. 22, 2016

Related U.S. Application Data

(62) Division of application No. 13/696,836, filed as application No. PCT/EP2011/058023 on May 18, 2011, now Pat. No. 9,367,881.

(Continued)

(30) Foreign Application Priority Data

May 25, 2010    (GB) .................................. 1008737.7

(51) Int. Cl.
*A01J 5/007*    (2006.01)
*A01K 1/12*    (2006.01)
(Continued)

(52) U.S. Cl.
CPC .............. *A01J 5/007* (2013.01); *A01J 5/003* (2013.01); *A01J 5/017* (2013.01); *A01K 1/123* (2013.01);
(Continued)

(58) Field of Classification Search
CPC .................................. A01K 1/126; A01J 5/007
(Continued)

(56) References Cited

U.S. PATENT DOCUMENTS 5,959,526 A    9/1999 Tucker
2006/0191485 A1    8/2006 Francke et al.
(Continued)

FOREIGN PATENT DOCUMENTS

EP    0438173    7/1991
RU    2327343    6/2008
(Continued)

OTHER PUBLICATIONS

European Office Action, dated Jul. 11, 2014, from corresponding EP application.

(Continued)

*Primary Examiner* — Son T Nguyen
(74) *Attorney, Agent, or Firm* — Young & Thompson

(57) ABSTRACT

A control and monitoring system for a rotating animal platform which includes multiple animal stalls arranged about its periphery, where the system includes an interactive display screen which displays output information relating to the current status of operations on the platform and which displays input channels for use by an operator, the platform itself is represented at said interactive display screen by an annular shape, each stall on the platform is graphically represented by a cell, the cells are displayed in a spatial arrangement corresponding to the arrangement of stalls on the platform, real-time status information relating to operations on the platform is represented at each cell, and the rotating movement of the platform is represented by the progression of each cell about the displayed representation of the platform.

20 Claims, 5 Drawing Sheets

Related U.S. Application Data

(60) Provisional application No. 61/347,976, filed on May 25, 2010.

(51) Int. Cl.
*G06Q 50/02* (2012.01)
*A01J 5/003* (2006.01)
*A01J 5/017* (2006.01)
*A01K 11/00* (2006.01)

(52) U.S. Cl.
CPC ............ *A01K 1/126* (2013.01); *A01K 11/006* (2013.01); *G06Q 50/02* (2013.01)

(58) Field of Classification Search
USPC ................................ 119/14.03, 14.04, 14.08
See application file for complete search history.

(56) References Cited

U.S. PATENT DOCUMENTS

| | | |
|---|---|---|
| 2006/0196431 A1 | 9/2006 | Kaever et al. |
| 2007/0137580 A1 | 6/2007 | Brown et al. |
| 2008/0009765 A1 | 1/2008 | Francke et al. |
| 2008/0257268 A1 | 10/2008 | Gudmundsson et al. |
| 2010/0289649 A1 | 11/2010 | Holmgren et al. |

FOREIGN PATENT DOCUMENTS

| | | |
|---|---|---|
| RU | 2346334 | 2/2009 |
| WO | 0117336 | 3/2001 |
| WO | 2004107852 | 12/2004 |
| WO | 2005000009 | 1/2005 |
| WO | 2008051134 | 5/2008 |
| WO | 2008154247 | 12/2008 |
| WO | 2009093967 | 7/2009 |

OTHER PUBLICATIONS

British Search Report, dated Sep. 21, 2010, from corresponding British application.
International Search Report, dated Sep. 2, 2011, from corresponding PCT application.
Supplementary International Search Report, dated Aug. 30, 2012, from corresponding PCT application.
Westfaliasurge; Proformance, DairyManagementSystem 21 Upravlenie stadom i doeniem, Feb. 19, 2007, Retrieved from the Internet on Aug. 21, 2012, http://www.westfaliaservis.ru/upload/files/Menegment/SHB_RU_DMS21_I.pdf.

ROTATING ANIMAL MILKING PLATFORM CONTROL AND MONITORING SYSTEM

BACKGROUND OF THE INVENTION

Field of the Invention

The present invention relates to a user interface for monitoring and controlling a rotating platform comprising multiple animal stalls. In particular, the present invention relates to the control and monitoring of dairy milking operations in an installation comprising multiple milking stalls on a rotating platform.

The keeping of animals in installations in an industrial establishment has been transformed by the advent and expanded use of information technology. As a consequence, the control of animal related processes has developed such that a great many parameters relating to equipment can be controlled accurately and rapidly. In addition, the amount of information which is gathered concerning individual animals and parameters relating to their management has greatly increased. It has thereby resulted that control and management systems have become increasingly complex, both in terms of the variety of information which is handled and in terms of the number of variables which can be controlled.

On the other hand, certain aspects of animal management retain a great deal in common with traditional practices, especially concerning the physical environment and concerning the animals themselves. For those individuals who work within an animal management installation and whose task it is to operate animal management systems, there is a need to enable the monitoring and control of operations using sophisticated equipment even while providing a control system which is easy to use and easy to learn and which is amenable and effective for use in a technology unfriendly environment.

Description of the Related Art

In patent application number WO 01/17336, there is disclosed a graphical user interface for the monitoring and controlling of parts of a dairy farm system. An exemplary embodiment which is disclosed in WO 01/17336 concerns the graphical representation of animal teats in a spatial relationship which corresponds schematically to the actual spatial arrangement of the teats. Another embodiment illustrates the positioning of control symbols or icons for certain elements in a milking installation such as gate opening/closing controls and manger positioning controls. The examples which are discussed all relate to a milking operation which is being carried out on an animal at a single location.

In milking installations which comprise rotary milking platforms with animal milking stations located about the platform periphery, multiple milking operations take place at one time. An example of a milking platform with animal stalls at its periphery and comprising a control system is disclosed in WO 2009/093967. Each milking operation on a platform typically starts and finishes at times which are staggered from the start or finish times of other milking operations on the same platform. Some milking platforms are large, and can thereby accommodate a large number of simultaneously occurring milking operations. Animals may be able to voluntarily access the platform and, having accessed the platform, they may or may not be permitted to be milked. Animals may receive feed, and any feed which animals are given may be provided in varying types or quantities, depending on the animal's needs. Leaving the platform may be obligatory or voluntary, and may take place at one or more designated locations. Some animals will yield more milk than others and some animals will be milked more quickly than others. The previously suggested solutions for creating input/output controls for animals being milked in individual stalls would lead, in the case of a rotary stall, to an information overload for operators. It is an object of the present invention to provide an input/output control system which allows simple, efficient and reliable monitoring and control of a rotary milking platform.

BRIEF SUMMARY OF THE INVENTION

According to the invention, the control and monitoring system may in particular comprise an input/output module associated with one or more system control computers and optionally with one or more data storage and management computers. The control and monitoring system will allow an operator to review the current operational status of the milking platform, while also inputting control commands or carrying out data entry or data correction in certain fields. Examples of suitable control and monitoring devices for use as input/output interfaces include display means such as touch-screen devices or a display screen associated with a keyboard and mouse, or combinations thereof. Alternatively, any suitable screen type display may be used in association with known input means such as keyboard, dedicated keypad or control switch panel or mouse device associated with a screen type input panel such as a keyboard, keypad or control panel. Such an input/output means may be known generally as an interactive display. Any display which displays output information relating to the platform or operations on the platform may also display one or more input channels though which control commands or data may be entered by an operator. In some embodiments, the system of the invention may comprise at least one display device which is for monitoring purposes only, in addition to at least one interactive display device of the system. A display-only device may be an interactive display device in which the input mode has been disabled, or it may be a display-only device with no input means. Input channels may be selectable input elements which are displayed for example in the form of icons such as control button icons or symbols or in the form of alphanumeric text entry fields or any combination of channel types.

In the present context, a rotating animal platform may comprise a circular or generally circular annular platform associated with drive means which may drive the platform in rotation in increments or at a slow, more or less constant speed. The platform rotation speed may in any case be adjustable in accordance with circumstances e.g. in accordance with the identified animals which are currently in place on the platform. The rotation of the platform may be driven by any suitable drive means and controlled by any suitable control means, in particular, drive control means associated with the system control means. The periphery of the platform is understood to designate that part of the platform on which animal stations are provided and will generally be located radially away from the centre of rotation of the platform, at, nearby or adjacent to the outer perimeter of the platform. Advantageously, access by operating personnel or by machinery to the animals on the platform is possible from a position inside the central area within the rotating annular platform, although in some designs, access to animals may be from outside the perimeter of the rotating platform.

A location on the rotary platforms where an animal may reside and where the animal may be treated may in particular be known as a stall. Any stall may suitably comprise an area which is large enough for an animal to reside. It may be surrounded by barrier or fence members, thereby separating neighbouring stalls from each other. It may be desirable to include restraining means for an animal at each animal stall. Restraining means could take the form of a body restrainer such as a neck lock or lock for another part of the animal's body or in the form of blocking means for the animal's body. Any restrainer or blocker or lock may suitably be associated with control means for automatic engagement or disengagement with the animal, thereby restraining or releasing the animal in a controlled manner from a stall.

According to the invention, the platform is graphically represented in a display of the control and monitoring system by means of a representation of cells in an arrangement which corresponds approximately or generally or closely to the spatial arrangement of stalls on the platform, where the number of cells corresponds to the total number of stalls on the platform. Preferably, all cells are of an equal or approximately equal size. In one aspect, each cell is represented as a sector of a generally annular platform arrangement. In another aspect, each cell is displayed as a window, with respective windows being arranged in an annular or approximately annular array. Alternatively, any suitable cell shape may be used for representing a stall. In another aspect, the platform is represented as a circular annular body divided into a number of cells of equal or approximately equal size. As the platform rotates, the graphical display is periodically updated so that the annular graphical representation on the display corresponds at all times closely to the current position of the cells on the platform. The rotation of the platform may be periodic or continuous, and the rotation of the platform representation may represent the rotational motion of the platform in any suitable manner. Continuous motion may be of constant or variable speed. In preferred embodiments, the movement of the platform is represented by the periodic updating of the position of each cell in the graphical image representation of the platform.

In further aspects of the invention, each cell displays one or more pieces of information, with each piece of information being placed at an information display sub-location inside each cell. In general it is envisaged to provide one or more such sub-locations per cell. Each sub-location may display e.g. an information icon or symbol or a text field. Hence, according to this embodiment, for each angular location of a represented cell about the periphery of the graphically represented platform, there is a unique position of one or more sub-locations.

In general, the selection by a user of any particular displayed graphically represented entity, by means of the interactive display device, will reveal additional information concerning that entity. In this context, an entity may be represented by an icon, a piece of text, a number or a representation of a physical object. In particular, an entity may be any piece of apparatus such as a robot or a stall or it may be an animal. In addition, any piece of text or information icon may be selectable to thereby reveal additional details. Hence, advantageously, in aspects of the invention, any icon or any text or number at a cell sub-location may be selectable by an operator from a display screen to reveal additional information e.g. concerning the operations in the corresponding stall or concerning the animal in the stall or concerning additional pieces of information related to the information shown at the selected sub-location of the relevant cell. The selection of a cell by a user of the interactive display device may in particular generate the display of additional information pertaining the animal and/or to the operation in a corresponding stall either as additional information in the platform screen view (i.e. as additional information displayed in combination with the platform representation view) or in an alternative view representing the selected cell in an enlarged, more detailed representation, containing a larger number of information fields and icons or symbols. Alternatively, a greater level of detail concerning a selected cell may be displayed as a cell-specific screen display, separate from either the platform representation or from a graphic representation of a cell or stall itself.

Accordingly, during use of the system of the invention, an operator supervising the activities on an animal platform will at all times during operation of the platform have a correspondence between the control system display and the current position of all the stalls on the platform, allowing the operator to easily and quickly monitor the progress of any and each of the contemporaneous operations in the respective stalls on the platform. The displayed information in each cell will provide a quick and ready reference for an operator, allowing any anomaly in the running of an operation to be spotted and acted upon. If necessary, the operator can use an input channel for adjusting information or parameters in any stall or robotic unit in order to modify current data relating to a particular operation or in order to make changes to operating parameters. At all times, the operator will be able to maintain a correspondence between the cell upon which adjustments are being made and the animal occupying the corresponding platform stall, thereby ensuring the best possible effectiveness during operation. This aspect may be of particular importance having regard to e.g. safety issues, for example, when an agitated animal is observed, its stall control location can be immediately found. Or, where an animal's current exhibited performance characteristics in a given cell appear out of the ordinary, then the animal can easily be seen at its corresponding location on the platform so that a rapid resolution of a possible problem can be facilitated. In all cases, the high level of correspondence between the displayed graphic image and the platform, as well as the simplified information display allows fast, safe, accurate and effective monitoring and control.

According to the invention, real-time status information, i.e. current updated information, relating to operations on the platform is displayed inside a cell by the interactive display device. The information may be displayed in the cells as well as in other parts of the display. Real-time status information may comprise any relevant information, in particular it may comprise current information which is updated such that it corresponds to actual measured process parameters or it may include information concerning a piece of apparatus or an animal. These parameters may in particular be any operating parameters or measures associated with the process in operation at the stall in question. According to a further aspect of the control and monitoring system of the invention, each cell which is included in the graphical representation may in particular exhibit status information relating to one or more parameters of an animal management process. Status information may be "real-time" information in the form of a progressively and frequently updated parameter measurement, such as e.g. current milk yield. It may also be information which is subject to periodic updating such as e.g. a cow number. A stall number represented in any cell may form part of the displayed information in the cell although it may be subject to less frequent updating because it consists of pre-set information. Status information parameters may also include animal parameters of an animal which is present in a relevant stall and may include animal specific data retrieved from an animal data bank. The data may include historic and current data specific to a given animal or herd.

In a further embodiment, each cell which is included in the graphical representation exhibits each process parameter at a respective discrete sub-location inside each cell. Each cell typically comprises an identical number of information sub-locations although this may not be immediately apparent from the cells themselves, because not all the information sub-locations may be occupied by a displayed piece of text or symbol or icon or text input prompt. As mentioned, a process parameter which is displayed in any cell may in particular be any piece of information relating to the stall which corresponds to the particular cell, such as the operation being carried out in the stall or the animal or equipment in the stall. In the case of a milking platform, a useful process parameter which may be exhibited is the animal identification number stored in a transponder which is worn by the animal. In the case of a cow, this may be the animal's cow number. In many cases, the animal also wears a visible physical record of its identification number. The correct identification of animals at the platform stall is important because it may be relevant for a teat cup application robot or a teat treatment robot such as a teat finding and preparation robot. When using a system according to the invention, an operator may observe that an incorrect identification number is entered in the system by comparing a number in a given displayed cell with the number worn on an animal at the corresponding platform stall. The constant correspondence between the position of a stall on the platform and its representation as a cell in a display makes it easier to spot any such discrepancies. A corrective measure could be taken by, e.g. selecting the alphanumeric transponder field in the relevant displayed cell and entering a corrected number.

An other example of a useful process parameter which may be displayed in a cell is the current milk yield of an animal. As each animal progresses around the platform, towards an exit location, a certain approximate level of milk yield can be expected. When an operator reviews the display representation of the platform, it may quickly become apparent that a surprisingly low yield is being generated, having regard to the relative position of the cell around the graphic representation. Action may thereby quickly be taken, either to monitor the animal in question more closely, to see if it is unwell, or if the equipment is malfunctioning or incorrectly applied. Additional information to be displayed in a cell may for example include some or all of: expected yield; animal weight; animal age; teat status (for each teat, an indication whether or not it has a teat cup attached); transponder serial number; error status; error code; warning message; information prohibiting the attaching of a teat (e.g. if something is wrong with it); other information message.

In general, all cells which are represented will preferably have an identical size and outline shape. In embodiments of the invention, the information sub-locations in each cell may be fixed. In such cases, all displayed cells will appear identical, but for the content of the information which is displayed in each cell. In order for any alphanumeric text to remain horizontal and clearly legible as a cell progresses around the periphery of the annular graphical representation, the cell's aspect in relation to the centre of rotation of the platform representation will be adjusted for each position about the periphery of the representation of the platform. For example, each cell may suitably be represented as a circle, ellipse or triangle or rectangle, such as a square.

As an alternative, in cases where the aspect of each cell remains the same in relation to the rotational centre of the platform representation, the text fields, symbols and/or icons at the respective cell sub-locations may require to be rotated and/or moved in relation to the cell in order to remain horizontal, and in order that displayed text fields or symbols do not run into each other or overlap i.e. they must remain readable and recognisable for an operator. For example, each cell may be represented as a sector of an annulus, with all cells being directly adjacent to two circumferentially adjoining cells. In such cases, the dimensions of a given symbol, icon or text field at a particular sub-location may be such that it will not fit inside the boundaries of a cell at all rotational angles of the cell, when the symbol, icon or text field remains horizontal. In order to prevent such an occurrence, the information sub-locations within a cell may be moved in relation to the cell and in relation to each other, in order to ensure that all the displayed information for a stall is fully contained within the boundaries of its corresponding cell, at all positions of the cell around the graphical platform representation.

Hence, in accordance with another aspect of the invention, the respective discrete sub-locations in each graphically represented cell each adopt a specific and unique relative positional arrangement for each represented circumferential position of a cell. According to these embodiments, each represented cell has a unique appearance, both in terms of its angular aspect in relation to the display device, and in terms of the relative positional arrangement of the cell sub-locations within it.

Advantageously, where it is desired to provide an optimised layout of the sub-locations for each cell position, the relative positions of the cell sub-locations may be derived from the angular position of the relevant cell about the periphery of the representation of said platform. In this way, all cells will always represent their displayed information in a convenient way, adapted to the particular cell in question. This aspect of the control system of the invention allows a display to show representations of platforms having different numbers of animal stalls, without creating a layout problem in case the number of stalls is increased or decreased. In addition, this arrangement ensures that an appropriate cell layout is always preserved, irrespective of the angular increments through which the displayed cells are moved each time the representation is periodically updated in the display, to reflect a changed angular platform position.

In a variant of the invention, as an alternative to deriving the positions of information sub-locations from the angular position of a cell, there may instead be stored a pre-defined set of sub-locations for each angular cell position about the annular platform representation.

In a particular aspect of the invention, the relative spatial positions of at least two sub-locations within each cell are transposed when the representation of a cell moves across an imaginary central horizontal plane which substantially bisects the graphically represented annular shape of the platform. This embodiment may be particularly advantageous in cases where alphanumeric text fields which are displayed at different sub-locations in a cell are of different length. In such cases, where a first and a second text field are displayed in a cell at a first and a second sub-location positioned one above the other when the cell is at the upper part of the graphic representation, it may be necessary for the first field to be displayed below the second field when the cell is at a lower part of the graphic representation, in order for the fields to fit adequately within the cell boundaries.

This aspect may best be understood with reference to examples in which the cells have the shape of e.g. sectors of a circle or annulus.

In a further aspect of the invention, each cell may be represented as a three-dimensional image. According to this aspect, the entire platform may be represented as a three-dimensional image. Optionally, each individual cell may be selected using the interactive display, and may be shown in a more detailed view.

According to still further aspects of the control and monitoring system according to the invention, the interactive display may show a graphical representation of the platform itself accompanied by the representation of one or more units which perform operations on the animals on the platform or on the platform itself. An unit may in particular be an automated unit such as a robot. In a milking platform, such a robot may be e.g. a teat attachment robot, a teat locating robot, a teat spraying (disinfecting) robot or a teat-cleaning robot or other treatment robot. Units which perform operations on the platform may include a platform- or stall-cleaning apparatus or sensor devices intended to provide triggers in case of safety alerts or platform technical malfunctions. In particular, any representation of a unit or such as an automated unit may exhibit real-time status information relating to operations being performed by that unit. Advantageously, according to aspects of the invention, each graphically represented entity in the interactive display may be individually selected by a user to thereby reveal additional status information relating to a stall corresponding to a given cell or to operations being performed by a particular unit. Additional information may be shown in a separate screen display view relating to the cell or to the unit which is selected. It may include a two- or three-dimensional image of the cell or unit. Additional status information relating to a stall or to an operating unit may shown in a display screen in addition to the graphical annular representation of the platform or in a separate screen image from said graphical annular representation of said platform. The control system and its interactive display may thereby allow a cascade of information views, with any view allowing a selection of additional information to be shown in further views.

BRIEF DESCRIPTION OF THE DRAWINGS

Further features and advantages of the system of the present invention will be explained with reference to examples and to illustrations of certain examples of various aspects of the invention and of an animal management system. Examples are provided for information and illustration purposes and are non-limiting as to the scope of protection.

DETAILED DESCRIPTION OF THE PREFERRED EMBODIMENTS

Figure 1:
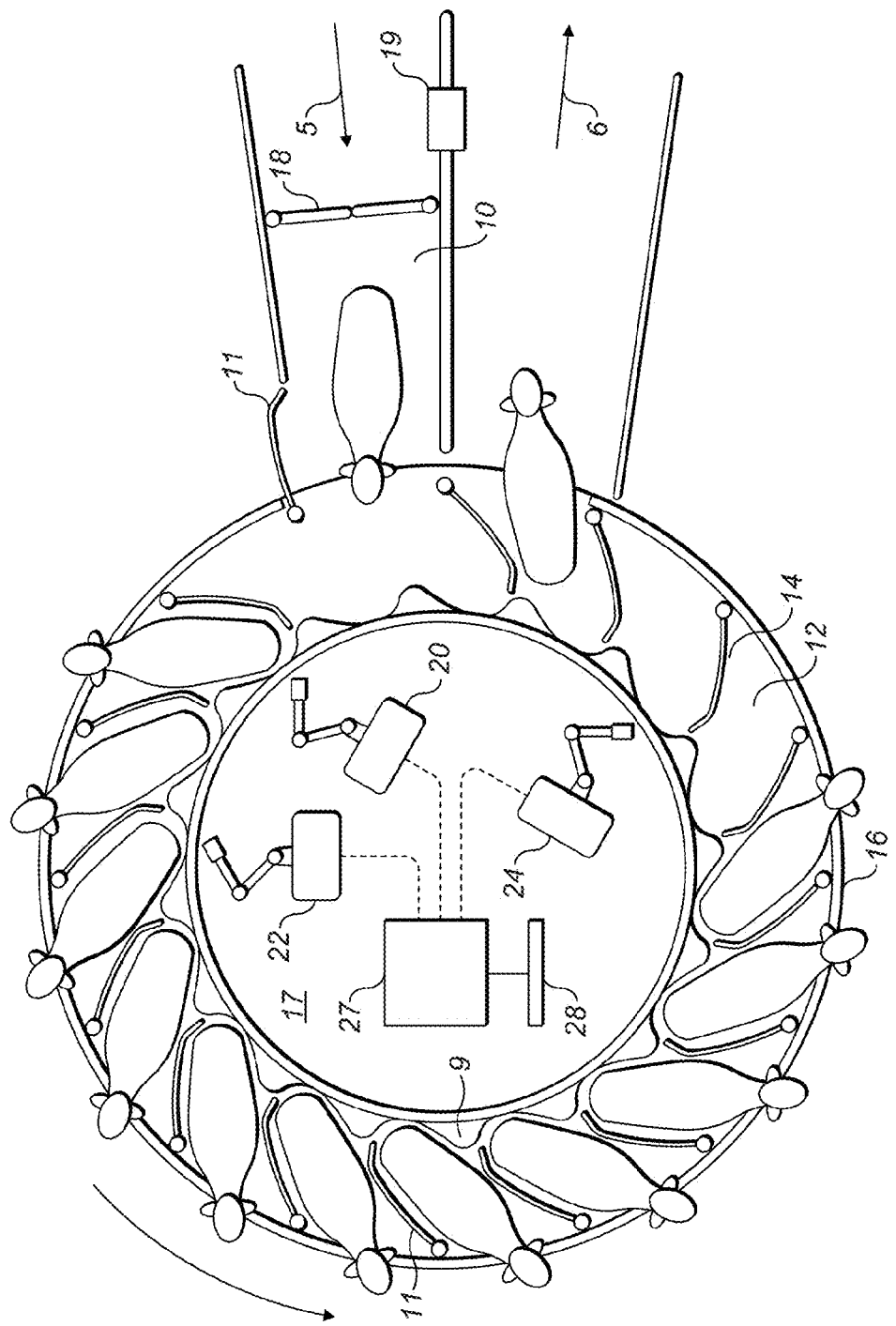
FIG. 1 shows an example of a rotary animal management platform.

The animal management platform which is shown in FIG. 1 comprises a rotary platform 14 surrounded on its outer circumference by a barrier 16. The illustrated barrier 16 is a stationary barrier which is interrupted at an entrance area 5 and an exit area 6. More entrance or exit areas could be provided as a matter of choice. Alternatively, the entrance or exit areas could be configured larger than illustrated in order to allow, for example more than one animal to access or leave the platform simultaneously. In another alternative arrangement, the barrier 16 could be movable around the external circumference of the platform 14 and could be articulated at each stall for permitting opening and closing of the stall thereby allowing animals to enter or leave a stall. An internal perimeter of the platform 14 in the form of a railing 9 prevents animals from leaving the platform in a direction towards its centre. In certain embodiments, a feed manger (not shown) may be provided in each stall 12, which may help to entice animals to enter the stalls 12 on the platform as well as providing animals with required nutrition.

The rotary platform 14 is divided into a series of neighbouring stalls 12, arranged around the periphery of the platform 14. Each stall is separated from its neighbouring stalls by a movable barrier 11 which defines the width extent of each stall in a generally circumferential direction. In the example illustrated, each stall 12 is designed to be occupied by a single animal. The positions of each movable barrier 11 are set up so that an animal is slightly restrained when it occupies a stall 12 when the barriers 11 at each circumferential side of the stall 12 are in a closed position. In the example of FIG. 1, the stalls are shown arranged on the platform in a so-called herringbone arrangement. Alternative arrangements include a tandem arrangement in which the stalls are longitudinally aligned parallel to the circumference of the platform or a parallel arrangement, in which the longitudinal direction of each stall is radially aligned about the platform. In all cases, animals are positioned at successive locations about the periphery of the platform 14.

The platform 14 which is illustrated has the shape of an annulus, i.e. of a circular ring. At the centre of the platform there is a central region 17 within which are shown various operating units which form part of the installation. Operating units may appropriately also be located outside the outer periphery of the platform. The location of operating units inside or outside the platform may depend upon the arrangement of animals on the platform (i.e. tandem vs. parallel or whether the animals face inwards or outwards). Operating units may include electromechanical units which carry out operations on animals or on the platform. Other operating units may include control system elements which interact with the platform, with the electromechanical units and with an operator and which may be linked to information databases. A control system element is illustrated at 27, with a display element at 28. The control element may be a computer or more than one computer and is shown having a communication link to each of three illustrated operating units 20, 22 and 24. Where the platform forms part of a milking installation, the unit 20 may be a robot for locating and preparing an animal's teats for milking, e.g. by placing a cleaning and stimulating device on the animal's teats. The unit 22 may be a robot for placing a set of teat cups on the teats of an animal for milking, while the unit 24 may be a post-treatment robot for disinfecting teats after milking has been completed. Other animal management operations may appropriately be performed on a platform, in which case the operating units may have alternative functions.

The entrance 5 is provided in the form of an entranceway with barriers either side and a control gate 18 with an identification receiver 19. An animal wearing a transponder passing along the entranceway 5 in the direction of the arrow is detected by the receiver and identification device 19 and, if the animal is permitted to enter the platform, then the gates 18 will be opened in order for the animal to pass into a buffer area 10 before it can move into a free stall 12 on the platform 14 via an open barrier 11. If the animal is not permitted to enter the platform, then an exit gate (not shown) may allow an animal to pass out from the entrance 5 without passing through access gates 18.

After passing the identification receiver 19 and the gates 18 and after entering the platform 14, the presence of an animal in a stall 12 of the platform 14 will be registered in the control system 27 of the platform. During each animal's stay on the platform 14, its presence will be visible in a displayed representation of the platform in an interactive display device 28 which is associated with the control system 27.

The display device 28 will be associated with interactive means such as a mouse or keyboard, or it may be a touch-screen, allowing an operator viewing the display to receive information concerning the processes which are taking place on the platform and to intervene in the processes if necessary. When a large number of animals are present on the platform, the handling of information may be critical, if it is to be possible for an operator to maintain an overview of progress being made. Hence, the information which is selected for presentation and the manner of presentation can be of significant importance in the effectiveness of the control system. In some cases there may be provided more than one display device associated with any given control and monitoring system of the invention. In particular, there may be provided at least one display device which is interactive and at least one display device which operates in a read-only mode. This would for example enable remote supervision of a rotary platform while leaving control interventions in a process on the platform to personnel at or nearby the platform which may be utilising an interactive display device located at or nearby the platform itself.

Figure 2A:
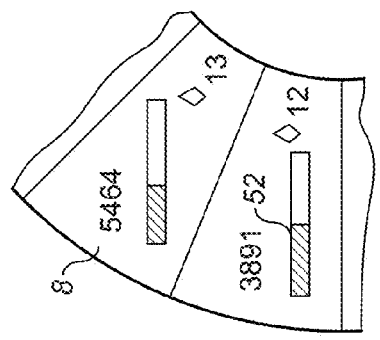
FIG. 2a shows an alternative example of information display within a cell.
Figure 2:
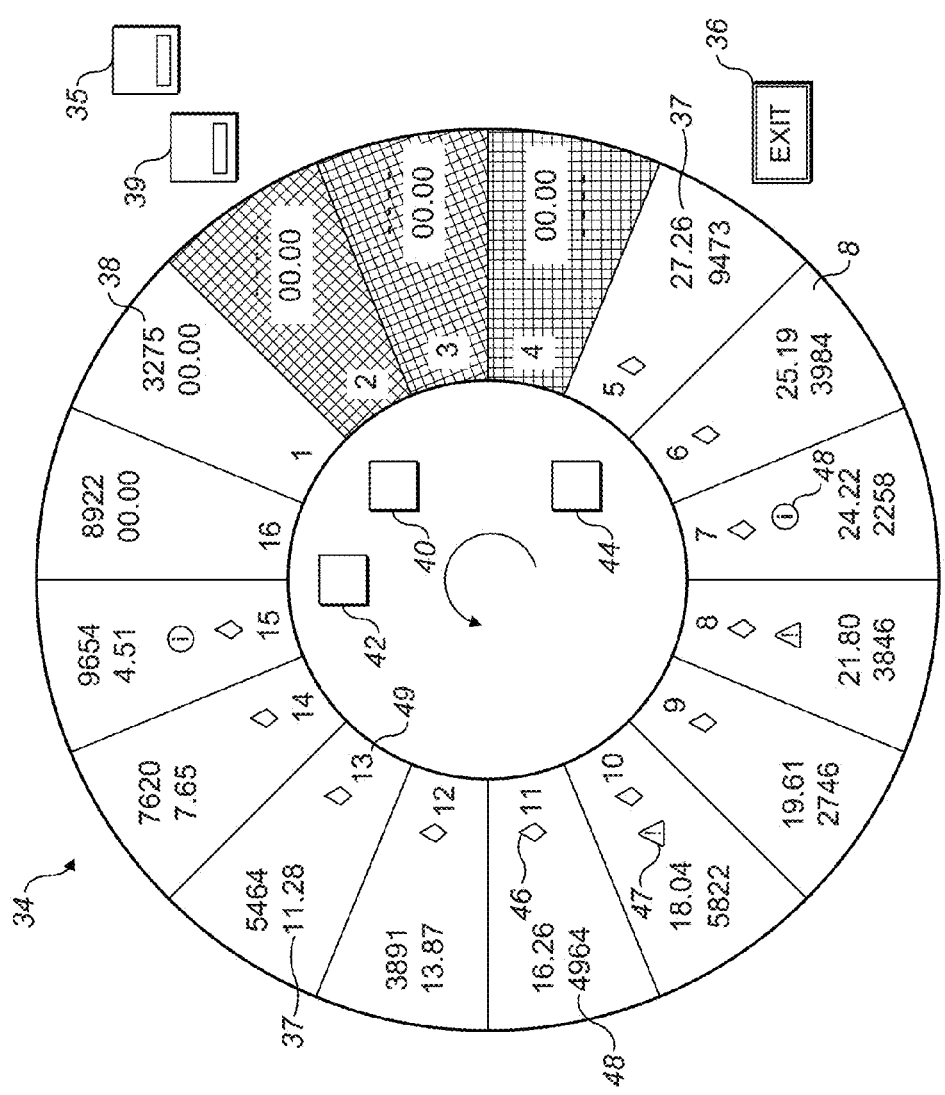
FIG. 2 shows an example of a graphical representation of an animal management platform which is used for milking.

FIG. 2 shows an example of the graphical representation 34 of a rotary platform which may have a layout somewhat similar to that which is illustrated in FIG. 1. In the graphical representation 34, each stall 12 on the platform 14 is shown as a cell 8 flanked on each circumferential side by neighbouring cells which represent neighbouring stalls. The platform 14 may be represented in a generally annular shape as shown by way of example as a circular annulus in FIG. 2, although other annular shapes may be envisaged depending e.g. on display screen space requirements. The annular shape of the graphic representation of the platform may thus be described as being ring-shaped, with the ring shape being a circular or generally circular appearance. For example, the annular shape may have the general outline of a polygon such as a rectangle or hexagon or octagon or any approximately circular, irregular shapes. A circular shape as shown in FIG. 2 may be preferred because it provides a close resemblance to the general shape of a rotary platform. The shape of the cells may also be selected in accordance with preferences such as the type of information to be displayed. The cells 8 shown in FIG. 2 have the outline of sectors of an annulus. This shape provides the advantage that it makes maximum use of the available space within the annular representation of the platform. A possible alternative, shown by way of example in FIG. 4 leaves more redundant space around the cells, although it provides the advantage that the position of the various information display fields in each cell is unchanged irrespective of the relative rotational position of the cell about the origin of the annular representation.

Figure 3:
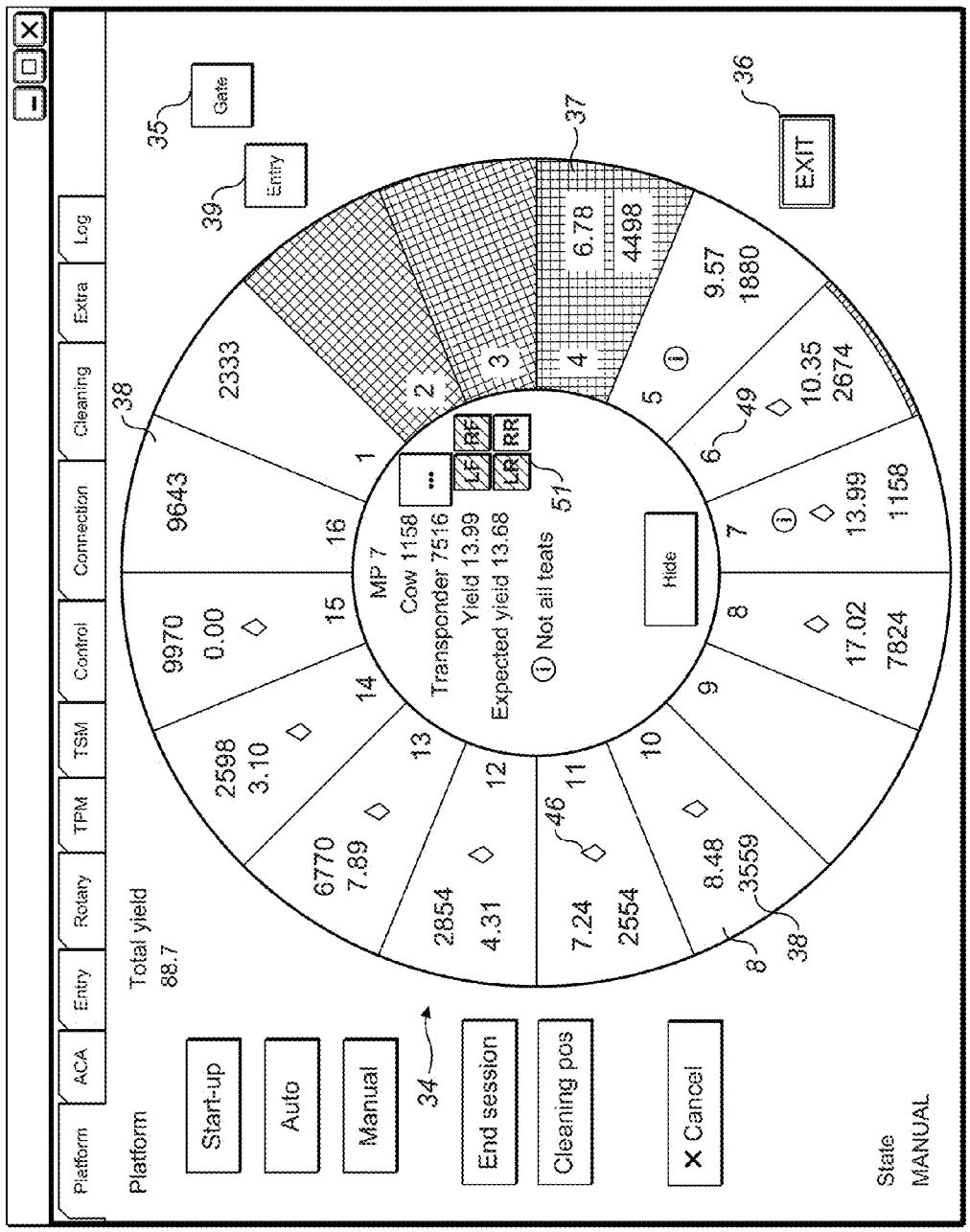
FIG. 3 shows an example of a screen display showing detail concerning a stall corresponding to a selected cell.

Also shown in FIG. 2 are operational unit icons 40, 42 and 44 which, in this case, represent the operational units shown in FIG. 1. Entrance 5 and exit 6 are represented by respective icons 35, 36 which may display status information by means of symbols, e.g. signaling that the entrance or exit station is occupied by an animal or that it is free. Also a buffer area 10 may be represented by an icon 39 which also may display via a symbol whether it is occupied or vacant. Other appropriate indications may be included in the entry or exit or buffer icons, such as, for example, the number of animals (cow count) having passed through the given location after any given start time of the platform. An example of a cow count is shown in FIG. 3. in the lower left hand portion of the screen display image. If a user selects any entity, such as an icon, from the display illustrated in FIG. 2, then additional information relating to that entity, i.e. to the apparatus or animal which it represents, may be displayed in a separate display or in a portion of the display screen which is illustrated in FIG. 2.

An arrow at the centre of the platform graphic image in FIG. 2 indicates the direction of rotation of the platform. As the platform 14 is rotated to move the stalls 12 progressively onward, so the positions of the respective cells 8 may be updated. Any appropriate movement increments may be utilised. In the example shown, there are sixteen stalls 12, each represented by a cell 8. When the platform is rotated through one sixteenth of a circle, the respective cells 8 in the displayed platform image 34 may be updated, thereby keeping the overall appearance of the image unchanged with the exception that the information displayed in each cell is moved along around the image periphery by one increment into the immediately adjacent neighbouring cell. In embodiments where cells are all identical and where the platform is moved in increments which correspond to a stall width, the platform movement which is replicated by the graphic display will appear to consist only of the progressive shifting of the displayed content of each cell from one cell to the next.

The various pieces of information which are displayed in each cell 8 may be updated periodically according to the same frequency as the updating of the cell position or they may preferably be updated more frequently. Preferably, all pieces of information or symbols which are displayed may be updated in real time or as near as possible to real time, i.e so that the information remains current. Hence, as soon as milking commences in a stall 2, the symbol 46 may appear in the cell corresponding to that stall. Alternatively, when milking commences in a certain stall, the corresponding graphic cell display may for example present a different background colour or may present a shading background in place of a clear background. As soon as an identified animal is confirmed to have taken up its position in a stall 12, relevant stored information for that animal may be retrieved by the control system 27 from a data bank and some of it may be displayed in the relevant cell.

In some cases, such as where historic teat positions are stored for individual animals, the teat position information is utilised by the attachment robot 42 and the preparation robot 40 although it may not necessarily be displayed. More useful information concerning teat cup attachment may be displayed to the user in a more user-friendly form than by the indication of a set of co-ordinates. An example of a manner in which teat information may be displayed during milking is illustrated by the teat icons 51 in FIG. 3. Each teat is shown in a box its appropriate position relative to the other teats (Left Front; Right Front; Right Rear etc.), with each box being of one shade when a cup is currently connected and of another shade when no cup is connected. The display thus allows an operator to easily note whether all cups are attached and if not, which cup is missing. In an alternative embodiment of this display icon, the respective shades of each of the boxes corresponding to a teat may be changed according to whether or not a teat is considered to be milkable.

Figure 4:
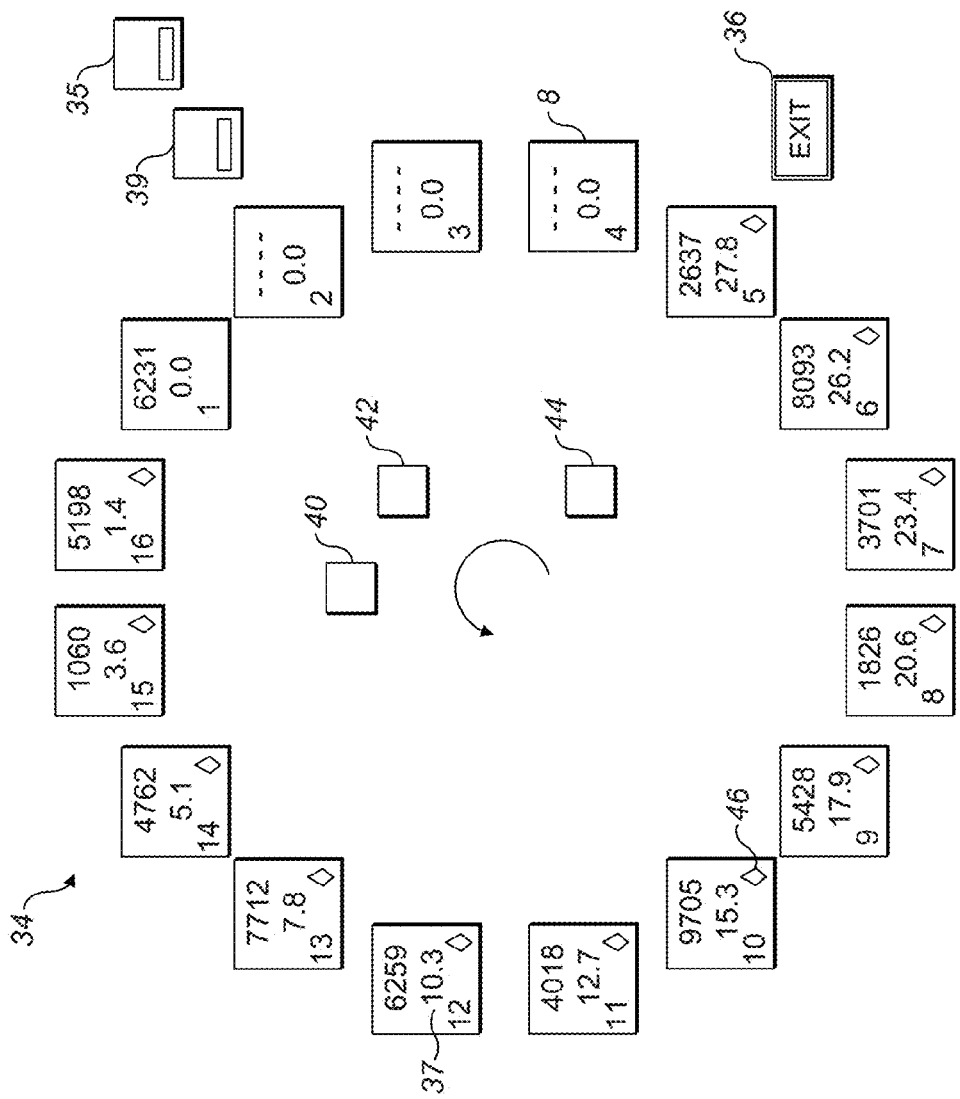
FIG. 4 shows an example of an alternative graphical representation of an animal management platform which is used for milking.

In the arrangements which are illustrated in FIGS. 2, 3 and 4, the information which is displayed in each cell is essentially the same and concerns a milking process. It comprises on one hand an identification number 38 of an animal in the corresponding stall, and an indication of that animal's current milk yield 37. The stall number 49 to which the displayed cell corresponds is also shown. Also shown, where applicable, is an icon 46 indicating that an animal is present in a stall and that milking has commenced for that animal.

Stalls in which no animal is present may be indicated in a different background shade or colour (see stalls 2, 3 and 4 in FIG. 2). In addition, a selected specific background colour may be used for any cell to denote a respective special status of the cell such as "disabled", or "defective" or "requiring cleaning". Examples can bee seen in FIG. 5, where stall number 14 is shaded because it is in need of or undergoing repairs. A maintenance icon 62 is additionally displayed. By clicking on the maintenance icon 62, additional information concerning the nature of the maintenance and its status may be displayed. Also in FIG. 5, stall number 10 is shaded because it is in need of or undergoing cleaning. Another maintenance icon 63 for cleaning is additionally displayed. As an alternative embodiment, an unoccupied stall may be shown as a completely blank cell, as for example cell number 9 in FIG. 3.

Alternative exemplary symbols which denote special indications concerning an animal are designated by numerals 47 and 48.

Figure 5:
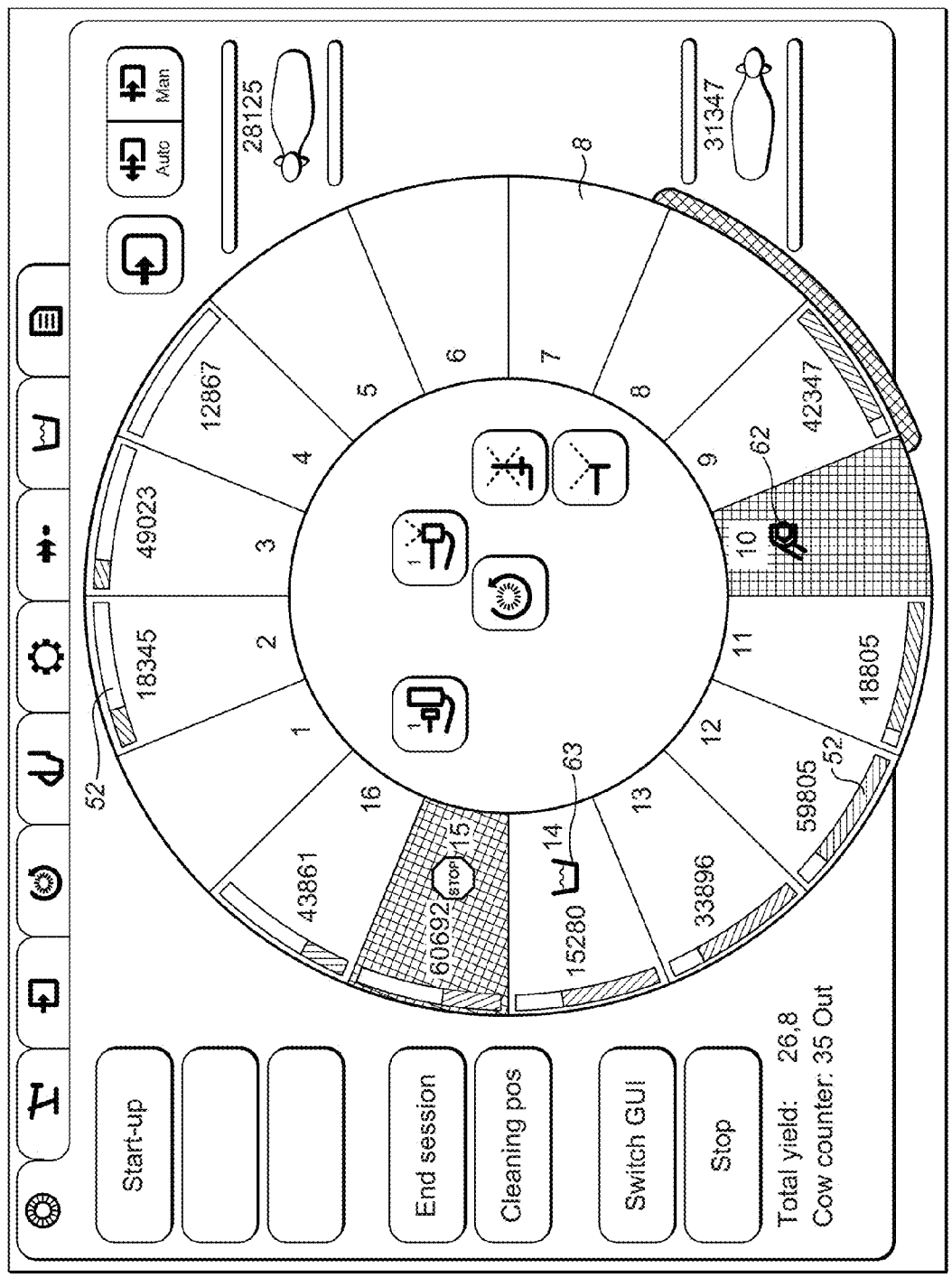
FIG. 5 shows an example of an alternative graphical representation of an animal management platform which is used for milking.

In the case of the milk yield which is displayed in each cell in respect of each animal being milked, an alternative to the display of the yield in alphanumeric form includes the display of the milk yield as a progress bar 52. According to this embodiment, shown by way of example at FIG. 2a, the outline of an elongated rectangle may be displayed in each cell, representing a zero quantity of milk yield from the animal occupying the corresponding stall. As the animal is milked, the rectangle outline is shown progressively filled up, mapping the proportion (e.g. percentage) of milk yielded in relation to the expected milk yield. As such, a quick glance at the display of the platform representation will enable an operator to easily see if any cell is not in accordance with the stage of progression of its corresponding milking operation. Any cell in which an animal's milking is progressing too slowly will immediately be visible as an anomaly in relation to its neighbours in the graphical representation. If many progress bars are showing a low level of milk yielded, in relation to their relative progress around the circle, then this may indicate a general defect in the milking equipment. Accordingly, in embodiments of the present invention, the milk yield of an individual animal may be displayed in a cell by a progress bar 52. In embodiments of the invention, the display of a progress bar 52 in any cell 8 may be withheld until the milking process of the animal in the relevant stall has commenced. Furthermore, in embodiments of the invention, a progress bar 52 may be displayed in each cell 8 as shown in FIG. 5, namely, wherein the longitudinal direction of the progress bar lies in a circumferential direction of the platform representation, preferably at an outer periphery thereof.

When a displayed cell 8 is selected by a user, relevant current information relating to the animal in the corresponding stall and relating to current process parameters may be displayed in an area of the screen showing the platform representation 34 or in a separate screen (not shown). Special indications which are signaled by the presence of symbols or icons may also be displayed following selection of a given cell. FIG. 3 provides an example of how additional information concerning an animal and the current status of a milking operation may be displayed following the selection of a cell 8 from the graphic representation of a platform 34.

The space required for displaying certain pieces of information may vary, depending on the information. For example, the number of digits needed for any given parameter display may vary. In the example shown in FIG. 2, the pieces of information which are displayed at each cell 8 are each positioned at a defined sub-location in the cell. The choice of the sub-location in a cell where a piece of information is to be displayed may thereby be dependent upon the amount of space available at that sub-location. The space available at any sub-location may depend upon the proximity of other sub-locations and also upon the shape outline of the cell itself. For ease of use, alphanumeric information which is displayed should be kept horizontal, irrespective of its position around the platform image. Thus, in the case of cell number 16 in FIG. 2, the available space for an alphanumeric parameter to be displayed is greatest at the top portion of the sector, where the cell is at its widest. That corresponds to an uppermost location in relation to the remaining sub-locations in that cell at that position. Smaller symbols or icons, and shorter text fields may be displayed at sub-locations which lie below of the uppermost location, where less cell width is available. Hence, the information which requires the most text space, in this case, the animal identification number, is displayed at the uppermost part of the cell when it is at its top position around the graphical image, above pieces of information requiring less space. On the other hand, for a cell located at the bottom of the platform representation, such as cell number 7 or 8 in FIG. 2, the greatest width is available at the lowermost part of the cell, below all other sub-locations in that cell.

As can be seen, as any cell 8 progresses about the annular representation 34, the positions of the sub-locations relative to the cell and relative to each other may be made to progressively change, in order to maintain an orderly cell view. In particular, the radial and circumferential position co-ordinates of each alphanumeric text field sub-location are required to be adapted progressively from one cell position to the next in order that the texts in the respective field do not run into each other. In order to achieve this, the positions of each text field or numerical field or information sub-location in any cell may be mapped (defined) for each possible cell position. Alternatively, an algorithm may be used to define for each angular cell position, the respective positions of each text field or numerical field or sub-location. The sub-locations in any cell will thus deviate incrementally from the locations in a previous and subsequent cell.

A special additional measure may be taken to ensure the clarity of the displayed cell information for a user. In certain embodiments, the relative position of neighbouring sub-locations in a cell may be inverted as the represented cells cross an imaginary horizontal line which bisects the platform representation. For example, where one alphanumeric parameter field is displayed vertically above another (the vertical direction being seen as being vertically inside the plane of the display screen), the positions of the topmost and the lowermost parameters may advantageously be inverted (i.e. swapped) as any cell crosses an imaginary horizontal centre line through the image. Where three or more parameters are displayed at sub-locations above one another, the top and bottom parameter positions may be exchanged, while a parameter displayed in between the topmost and lowermost parameter may remain in its same relative position (the middle position).

The control and monitoring system according to the invention has been described with reference to various embodiments and examples. Accordingly, an operator of the animal management platform receives an intuitive interface for controlling the complex system. This is provided in the form of a graphical representation of the system using images and symbols which directly represent physical units of the system. Clicking a symbol or image makes it possible to operate and/or get more information about the unit. Advantageously, the platform is graphically represented as a circle or annulus, which comprises segments which represent each stall or milking point and thereby gives an intuitive picture of the current status for each stall and for any surrounding robots and gates. The graphic representation of the rotary platform rotates in order to always display the current state of the platform. Embodiments of the invention may typically use two-dimensional representations of the platform although three-dimensional representations may be preferred. The platform is thereby displayed in a more realistic way than known devices and allows a more intuitive interaction with an operator. In further embodiments of the invention, the physical units surrounding the platform may be displayed as three-dimensional images. Additional variations and embodiments will be apparent to those in the art within the scope of the appended claims.

The invention claimed is:

1. A rotating animal milking platform control and monitoring system, comprising:
  a platform (14) comprising plural animal stalls arranged about a periphery thereof, the platform having an annular shape, the animal stalls dividing the annular shape, the platform being a rotary platform with rotary movement;
  operating units (20, 22, 24), the operating units being from the group consisting of electromechanical units which carry out operations on animals on the platform (14), electromechanical units which carry out operations on the platform (14), control system elements which interact with the platform (14), control system elements which interact with the electromechanical units, and control system elements which interact with an operator; and
  a control system (27) that comprises a control computer with data storage, the control computer operatively connected to the platform (14), operatively connected to the operating units, and monitoring a current status of operations on the platform and in the stalls,
  the control system including an interactive display (28) which displays:
  i) output information relating to the control computer monitored current status of operations on the platform,
  ii) a representation of an entirety of the annular shape of the platform with each of the stalls graphically represented by a cell (8) within the representation of the annular shape of the platform, wherein the cells are displayed in a spatial arrangement corresponding to a physical arrangement of corresponding stalls on the platform, and wherein the rotating movement of the platform is represented, over time, by a progression of each cell about the displayed annular shape representing the platform,
  iii) within the cells, real-time status information relating to the control computer monitored operations on the platform, and
  iv) within the cells, input channels for use by the operator, the input channels individually selectable by the operator to reveal additional status information relating to control computer monitored operations of the corresponding stall,
  wherein, the control system a) monitors the rotation of the platform and each stall within the platform, and b) as the platform rotates, automatically periodically updates the interactive display, including the real-time status information relating to the control computer monitored operations within the cells, so that the rotating movement of the platform is represented by a progression of the graphical representation of each cell within the representation of the annular shape of the platform, with a position of the graphical representation of each cell within the representation of the annular shape, corresponding to the current position of the corresponding stall on the platform, and
  wherein the real-time status information displayed within each cell shows one of more process parameters displayed at one of more respective sub-locations inside the cell,
  and wherein i) a shading or a background color of cells automatically change based on real-time status information relating to the control computer monitored operations in each respective cell on the platform, or ii) a milking progress display appears automatically in each individual cell based on each real-time status information of milking operation commencing in each respective individual cell on the platform, the shading or background color change and the milking progress display appearing at milking commencing thereby visually notifying the operator of the change of condition of the monitored operation.

2. The rotating animal milking platform control and monitoring system of claim 1, further comprising:
  further input channels operable by the operator to perform at least one of entering data correction and entering control commands for carrying out the operations on the platform,
  the further input channels being in the form of at least one of i) icons, and ii) alphanumeric text entry fields,
  wherein the further input channels are operable by the operator to enter data correction concerning the operations of one of the stalls,
  wherein the further input channels are operable by the operator for carrying out the operations of the stall,
  wherein the operating units (20, 22, 24) include robot operative for at least one of the group consisting of i) placing a cleaning and stimulating device on the animal's teats, ii) placing a set of teat cups on the teats of an animal for milking, and iii) post-treatment operations for disinfecting teats after milking has been completed, and
  wherein the interactive display (28) is at a location remote from the platform.

3. The rotating animal milking platform control and monitoring system of claim 2, wherein, when an animal management process is being conducted on an animal present in the corresponding stall represented by the cell, each of the one of more process parameters in the cell exhibits current status information relating to a parameter of the animal management process being conducted on the animal present in the corresponding stall represented by the cell, and
wherein the shading or the background color of cells representing stalls without animals present are shaded or is different from cells representing stalls with animals present.

4. The rotating animal milking platform control and monitoring system of claim 3, further comprising an animal data bank operatively connected to the control system, the animal data bank comprising animal specific data including current data specific to the animal present in the corresponding stall, wherein,
the control system communicates with the animal data bank and retrieves the current data specific to the animal present in the corresponding stall from the animal data bank so that the current status information includes animal parameters of the animal present in the corresponding stall.

5. The rotating animal milking platform control and monitoring system of claim 1, further comprising:
further input channels operable by the operator to perform at least one of entering data correction and entering control commands for carrying out the operations on the platform,
the further input channels being in the form of at least one of i) icons, and ii) alphanumeric text entry fields,
wherein the further input channels are operable by the operator to enter data correction concerning the operations of one of the stalls.

6. The rotating animal milking platform control and monitoring system of claim 5, wherein the further input channels are operable by the operator for carrying out the operations of the stall.

7. The rotating animal milking platform control and monitoring system of claim 6, wherein the operating units (20, 22, 24) are the electromechanical units which carry out operations on the animals on the platform within the stalls, and the further input channels are operable by the operator for carrying out the operations of the plural operating units (20, 22, 24) via the control computer.

8. The rotating animal milking platform control and monitoring system of claim 7, wherein,
the input channels are further operable by the operator to enter control commands changing operating parameters of one of the operating units carrying out the operations at the corresponding stall.

9. The rotating animal milking platform control and monitoring system of claim 1, wherein,
the representation of the annular shape of the platform on the interactive display is one of the group consisting of i) a circular annulus shape, ii) a ring shape, iii) a polygon shape, and iv) a circular, irregular shape.

10. The rotating animal milking platform control and monitoring system of claim 1, wherein,
the representation of the annular shape of the platform on the interactive display is one of the group consisting of i) a circular annulus shape, and ii) a ring shape, and the representation of the annular shape of the platform has an inner perimeter and an outer perimeter, in the representation, each cell has a shape of a sector of the annular shape, and
a display area located radially inside the inner perimeter of the representation of the annular shape includes further automatic real-time status information relating to the control computer monitored current status of milking operations in a selected one of the stalls on the platform.

11. The rotating animal milking platform control and monitoring system of claim 1, wherein,
each cell shows at least two process parameters displayed at respective discrete sub-locations inside the cell.

12. The rotating animal milking platform control and monitoring system of claim 11, wherein,
the respective discrete sub-locations in each cell change and adopt the specific and unique relative arrangement in the cell for each represented circumferential position of the cell.

13. The rotating animal milking platform control and monitoring system of claim 12, wherein,
the change in said specific and unique relative arrangement in the cell for each respective discrete sub-location is derived from a current angular position of the cell about the periphery of the representation of the annular shape.

14. The rotating animal milking platform control and monitoring system of claim 11, wherein,
relative spatial positions of said sub-locations within each cell are transposed when the cell moves across a central horizontal plane which substantially bisects the annular shape.

15. The rotating animal milking platform control and monitoring system of claim 1, wherein,
the change in said specific and unique relative arrangement in the cell for each respective discrete sub-location is pre-determined for each angular position of the cell about the periphery of the representation of the annular shape.

16. The rotating animal milking platform control and monitoring system of claim 1, wherein the background color within the cells change based on a change in the real-time status information relating to the control computer monitored operations on the platform, and a specific color corresponds to a specific status of the cell.

17. The rotating animal milking platform control and monitoring system of claim 1, wherein,
said additional status information relating to the corresponding stall is displayed in addition to and in combination with the annular shape representation of said platform, and
the representation of the annular shape of the platform on the interactive display is a circular annulus shape.

18. The rotating animal milking platform control and monitoring system of claim 1, wherein,
said additional status information relating to the corresponding stall is displayed in addition to the annular shape representation of said platform in a separate image apart from said graphical annular representation of said platform, and
the representation of the annular shape of the platform on the interactive display is a circular annulus shape.

19. A rotating animal milking platform control and monitoring system, comprising: a platform (14) comprising plural animal stalls arranged about a periphery thereof, the platform having an annular shape, the animal stalls dividing the annular shape, the platform being a rotary platform with rotary movement; operating units (20, 22, 24), the operating units being from the group consisting of electromechanical units which carry out operations on animals on the platform (14), electromechanical units which carry out operations on the platform (14), control system elements which interact with the platform (14), control system elements which interact with the electromechanical units, and control system elements which interact with an operator; and a control system (27) that comprises a control computer with data storage, the control computer operatively connected to the platform (14), operatively connected to the operating units, and monitoring a current status of operations on the platform and in the stalls, the control system including an interactive display (28) which displays: i) output information relating to the control computer monitored current status of operations on the platform, ii) a representation of an entirety of the annular shape of the platform with each of the stalls graphically represented by a cell (8) within the representation of the annular shape of the platform, wherein the cells are displayed in a spatial arrangement corresponding to a physical arrangement of corresponding stalls on the platform, and wherein the rotating movement of the platform is represented, over time, by a progression of each cell about the displayed annular shape representing the platform, iii) within the cells, real-time status information relating to the control computer monitored operations on the platform, and iv) within the cells, input channels for use by the operator, the input channels individually selectable by the operator to reveal additional status information relating to control computer monitored operations of the corresponding stall, wherein, the control system a) monitors the rotation of the platform and each stall within the platform, and b) as the platform rotates, automatically periodically updates the interactive display, including the real-time status information relating to the control computer monitored operations within the cells, so that the rotating movement of the platform is represented by a progression of the graphical representation of each cell within the representation of the annular shape of the platform, with a position of the graphical representation of each cell within the representation of the annular shape, corresponding to the current position of the corresponding stall on the platform, and wherein the real-time status information displayed within each cell shows one of more process parameters displayed at one of more respective sub-locations inside the cell, wherein a background color of cells automatically change based on real-time status information relating to the control computer monitored operations in each respective cell on the platform, a background color change in an individual stall indicating a change of condition of the monitored operation in the individual cell thereby visually notifying the operator of the change of condition of the monitored operation.

20. A rotating animal milking platform control and monitoring system, comprising: a platform (14) comprising plural animal stalls arranged about a periphery thereof, the platform having an annular shape, the animal stalls dividing the annular shape, the platform being a rotary platform with rotary movement; operating units (20, 22, 24), the operating units being from the group consisting of electromechanical units which carry out operations on animals on the platform (14), electromechanical units which carry out operations on the platform (14), control system elements which interact with the platform (14), control system elements which interact with the electromechanical units, and control system elements which interact with an operator; and a control system (27) that comprises a control computer with data storage, the control computer operatively connected to the platform (14), operatively connected to the operating units, and monitoring a current status of operations on the platform and in the stalls, the control system including an interactive display (28) which displays: i) output information relating to the control computer monitored current status of operations on the platform, ii) a representation of an entirety of the annular shape of the platform with each of the stalls graphically represented by a cell (8) within the representation of the annular shape of the platform, wherein the cells are displayed in a spatial arrangement corresponding to a physical arrangement of corresponding stalls on the platform, and wherein the rotating movement of the platform is represented, over time, by a progression of each cell about the displayed annular shape representing the platform, iii) within the cells, real-time status information relating to the control computer monitored operations on the platform, and iv) within the cells, input channels for use by the operator, the input channels individually selectable by the operator to reveal additional status information relating to control computer monitored operations of the corresponding stall, wherein, the control system a) monitors the rotation of the platform and each stall within the platform, and b) as the platform rotates, automatically periodically updates the interactive display, including the real-time status information relating to the control computer monitored operations within the cells, so that the rotating movement of the platform is represented by a progression of the graphical representation of each cell within the representation of the annular shape of the platform, with a position of the graphical representation of each cell within the representation of the annular shape, corresponding to the current position of the corresponding stall on the platform, and wherein the real-time status information displayed within each cell shows one of more process parameters displayed at one of more respective sub-locations inside the cell, wherein a shading of cells automatically change based on real-time status information relating to the control computer monitored operations in each respective cell on the platform, a shading change in an individual stall indicating a change of condition of the monitored operation in the individual cell thereby visually notifying the operator of the change of condition of the monitored operation.

* * * * *